United States Patent
Bastian

(10) Patent No.: US 12,486,110 B2
(45) Date of Patent: Dec. 2, 2025

(54) METHOD FOR STORING LOAD CARRIERS IN A RACK

(71) Applicant: BITO-LAGERTECHNIK BITTMANN GMBH, Meisenheim (DE)

(72) Inventor: Peter Bastian, Fuerfeld (DE)

(73) Assignee: BITO-LAGERTECHNIK BITTMANN GMBH, Meisenheim (DE)

( * ) Notice: Subject to any disclaimer, the term of this patent is extended or adjusted under 35 U.S.C. 154(b) by 341 days.

(21) Appl. No.: 18/032,650

(22) PCT Filed: Oct. 22, 2021

(86) PCT No.: PCT/EP2021/079360
§ 371 (c)(1),
(2) Date: Apr. 19, 2023

(87) PCT Pub. No.: WO2022/090080
PCT Pub. Date: May 5, 2022

(65) Prior Publication Data
US 2024/0051744 A1    Feb. 15, 2024

(30) Foreign Application Priority Data
Oct. 26, 2020 (EP) .................................... 20203948

(51) Int. Cl.
*B65G 1/04* (2006.01)
*B65G 43/08* (2006.01)

(52) U.S. Cl.
CPC .......... *B65G 1/0421* (2013.01); *B65G 43/08* (2013.01); *B65G 2203/0258* (2013.01)

(58) Field of Classification Search
CPC .......... B65G 1/02; B65G 1/04; B65G 1/0421; B65G 43/00; B65G 43/08
(Continued)

(56) References Cited

U.S. PATENT DOCUMENTS 5,149,240 A * 9/1992 Di Rosa ................... B65G 1/02
                                                    414/277
10,086,998 B1 * 10/2018 Tilekar ................. B65G 1/1373
(Continued)

FOREIGN PATENT DOCUMENTS

CN    104067182 B  *  4/2017  ............. G06Q 10/08
CN    110921179 A  *  3/2020  ........... B65G 1/0485
(Continued)

OTHER PUBLICATIONS

Thenert, Alexander, "International Search Report", mailed Jan. 20, 2022, issued in corresponding PCT Application No. PCT/EP2021/079360, filed Oct. 22, 2021, including English translation of the ISR.

*Primary Examiner* — Terrell H Matthews
(74) *Attorney, Agent, or Firm* — PERRY + CURRIER INC.

(57) ABSTRACT

The invention relates to a method for storing load carriers in a rack (100), wherein a load limit according to a static design is assigned to the rack (100) with respect to the load with load carriers, wherein the rack (100) has fields (200) each with multiple compartments (202), and the compartments (202) each have one or more storage locations (204) for load carriers (206), wherein the method comprises a storage location determination for one or more of the compartments (202) which comprises: receiving a first piece of information regarding the spatial allocation and respective load of storage locations (204) occupied by load carriers (206); receiving a second piece of information regarding the spatial location of one or more free storage locations (204) of the compartment(s) 202); receiving a third piece of information regarding the weight of the load carrier (400) to be stored; determination of the storage location (204) of the compartment(s) (202) to be used for storing the load carrier (400) on
(Continued)

Figure 1:
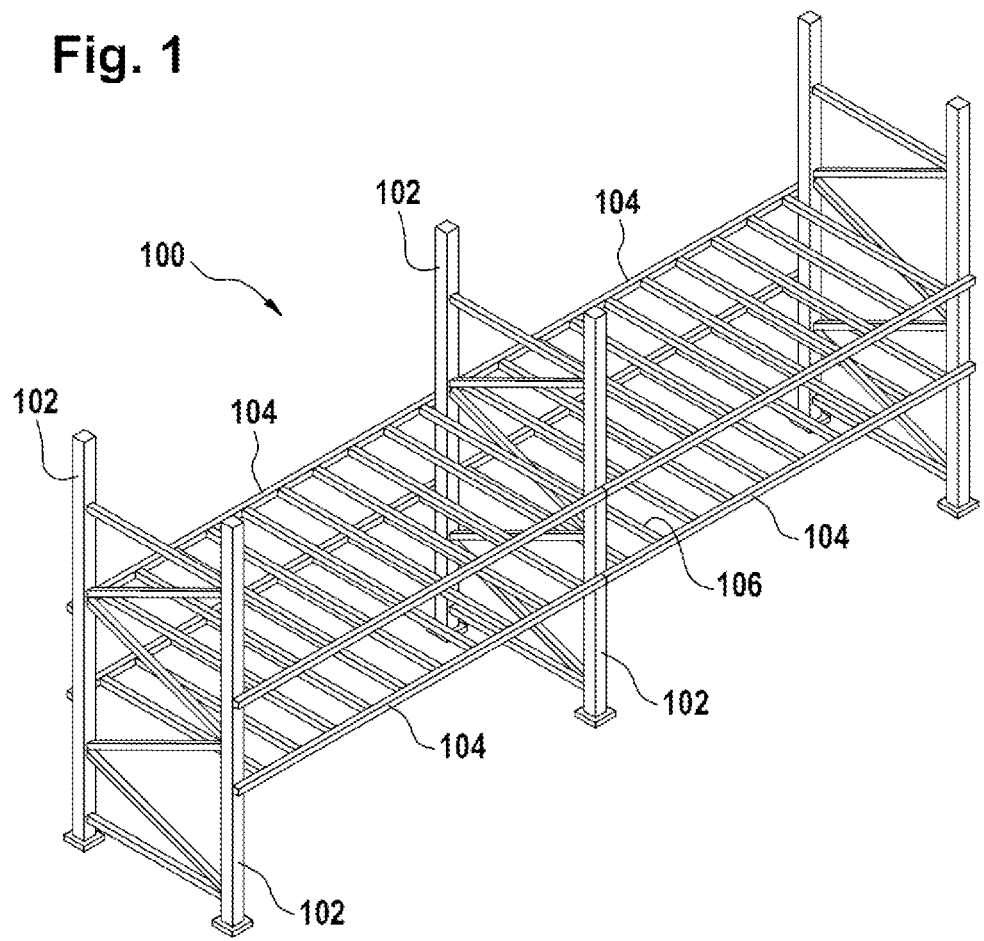

the basis of the first, second, and third pieces of information and the load limit.

16 Claims, 5 Drawing Sheets

(58) Field of Classification Search
USPC .......................................................... 414/273
See application file for complete search history.

(56) References Cited

U.S. PATENT DOCUMENTS

| | | | | |
|---|---|---|---|---|
| 10,538,256 | B2 * | 1/2020 | Sato | ............................ B61F 1/12 |
| 11,708,215 | B2 * | 7/2023 | Lindbo | ................. B65G 1/0464 |
| | | | | 414/281 |
| 2012/0130527 | A1 * | 5/2012 | Jungen | .................. B65G 1/0407 |
| | | | | 700/112 |
| 2014/0031971 | A1 * | 1/2014 | Bridges | ................... G11B 15/68 |
| | | | | 700/214 |
| 2016/0107838 | A1 * | 4/2016 | Swinkels | .............. B65G 1/1373 |
| | | | | 414/273 |
| 2018/0365642 | A1 * | 12/2018 | Bonner | .................... A47F 10/00 |
| 2022/0162012 | A1 * | 5/2022 | Nokelby | ................. B65G 43/08 |

FOREIGN PATENT DOCUMENTS

| | | | | | |
|---|---|---|---|---|---|
| CN | 114728744 | A | * | 7/2022 | ............ B65G 1/1371 |
| CN | 116157816 | A | * | 5/2023 | ............ B07C 5/3422 |
| DE | 202024101638 | U1 | * | 4/2024 | ................ F16F 7/125 |
| EP | 3988476 | A1 | * | 4/2022 | ................. B65G 1/02 |
| EP | 4099244 | A1 | * | 12/2022 | ............ B65G 1/0464 |
| JP | 2013011158 | A | | 1/2013 | |
| JP | 5274267 | B2 | * | 8/2013 | |
| WO | 2009052891 | A1 | | 4/2009 | |

* cited by examiner

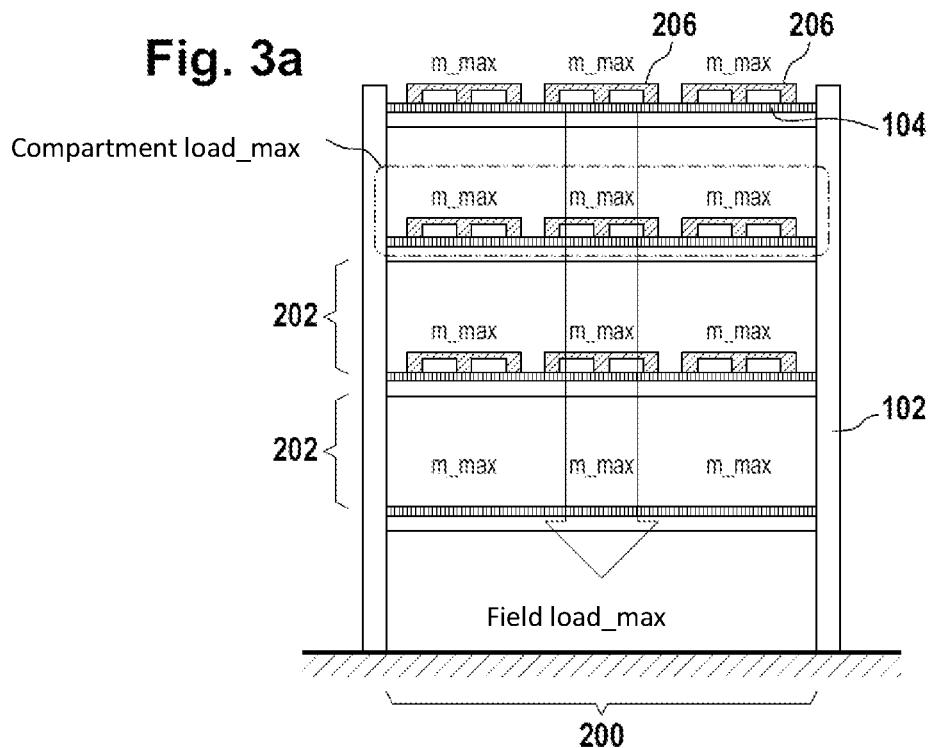
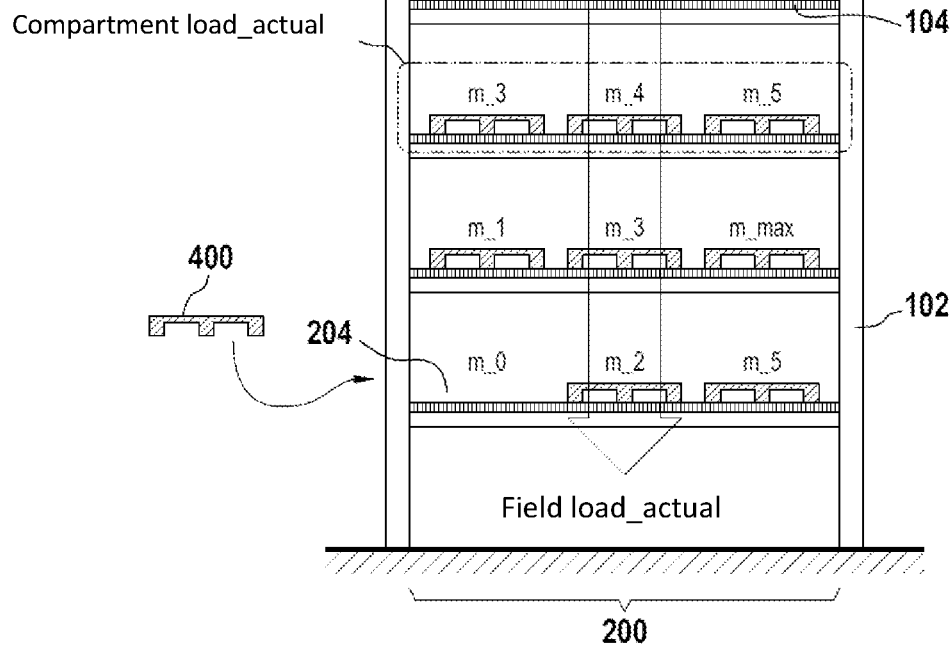

Fig. 4
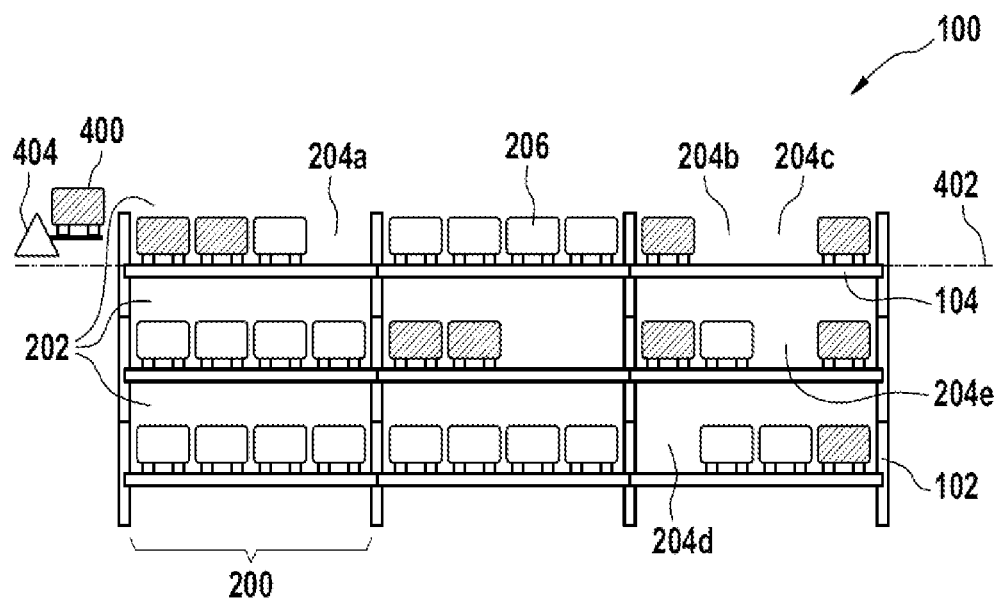
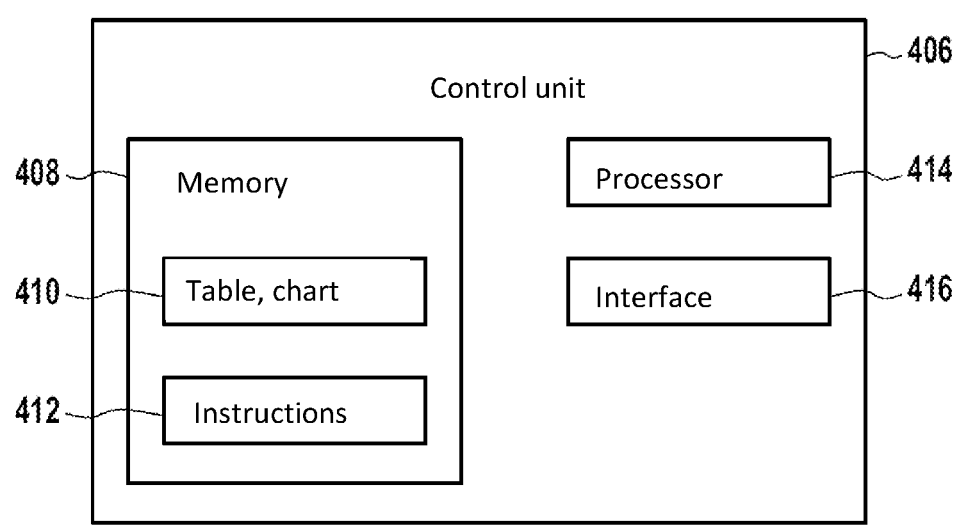

METHOD FOR STORING LOAD CARRIERS IN A RACK

The invention relates to a method for storing load carriers in a rack, and a rack system with a rack for storing load carriers in the rack.

Racks are used to store load carriers. For example, the load carriers may be pallets, cartons, boxes, among others. A rack is therefore divided into multiple compartments stacked one above the other, wherein the stacked compartments form a so-called field. Multiple fields may be arranged next to one another and behind one another.

It must be ensured for the racks that they satisfy corresponding stability requirements. The security of racks is regulated in various standards. One example of this is DIN EN 15512 "Steel static storage systems. Adjustable pallet racking systems. Principles for structural design". With regard to operating and checking racks, it is DIN EN 15635 "Fixed steel racking systems-Applications and maintenance of storage equipment". DIN EN 15620 "Steel static storage systems-Adjustable pallet racking-Tolerances, deformations and clearances", and DIN EN 15629 "Steel static storage systems-Specification of storage equipment", provide assistance in planning and purchasing a rack system. In addition, there are requirements regarding limit deviations, deformations and free spaces, which are specified by the suppliers who configure the automation with storage and retrieval devices and/or shuttle devices.

WO2009/052891 A1 discloses a method for storing stored goods carriers in a storage device.

The underlying object of the invention is to provide a method for storing load carriers in a rack, and a rack system with a rack for storing load carriers in the rack. The problems underlying the invention are solved by the features of the independent patent claims. Preferred embodiments of the invention are specified in the dependent patent claims.

A method is disclosed for storing load carriers in a rack, wherein a load limit according to a static design is assigned to the rack regarding the loading with load carriers, wherein the rack has fields with several compartments each, and the compartments each have one or more storage locations for load carriers, wherein the method comprises a storage location determination. The storage location determination comprises: receiving a first piece of information regarding the spatial allocation and respective load of storage locations of one of more of the compartments occupied by any load carriers; receiving a second piece of information regarding the spatial location of one or more free storage locations of the compartment(s); receiving a third piece of information regarding the weight of the load carrier to be stored; determination of the free storage location of the compartment to be used for storing the load carrier based on the first, second, and third pieces of information and the load limit, wherein the determination is carried out such that the load limit is not exceeded during the storing of the load carrier. The previously described main aspect may thus comprise a method for storage location determination, e.g., for determining a free storage location in a rack for at least one load carrier, wherein all previously mentioned steps are usually carried out by a control unit. The actual storing follows the method for determining a free storage location in the storage location thus determined, and is preferably carried out by storing and transport means known in themselves, as they are also specified below.

It should be noted that a "load limit according to a static design" is to be understood, e.g., as a design with respect to one or more of the DIN standards mentioned above. In addition to or instead of a purely maximum permissible weight load, the load limit may also comprise a maximum deformation of rack elements resulting from the load. The load limit may describe a limit of the rack system, a failure of the rack system threatening to occur when it is exceeded. It is also possible that the load limit describes a functional limit of the rack system, and the functionality of the rack system may no longer be guaranteed when it is exceeded. Such a functionality may be, e.g., the unimpeded storage process of load carriers in the rack, which is no longer possible upon exceeding the load limit and an associated deformation of rack components, as a defined storage processes is prevented due to the deformations. Such a functionality may be based on a guide function of storage modules (e.g., rack shuttles, in particular automated storage and retrieval devices), wherein these storage modules are moved relative to the rack, using the guide function of the rack, and function for storing the load carriers. One example for this is an automated small parts warehouse (AKL) or an automated pallet warehouse (APW). Functional degradation might result from a deformation of corresponding guide means on the rack, so that a defined storage process might also no longer be possible here. In this respect, the functional degradation might affect the performance and availability of the entire system made of racks and operating units.

The person skilled in the art understands that the above listed process also analogously applies to a retrieval process.

Embodiments might have the advantage that storage of load carriers in the rack is flexibly possible, wherein the possible load of the rack is, e.g., maximized. For example, instead of stipulating a constantly identical maximum upper load limit per storage location with respect to storing "light" load carriers, the method considers, in particular the compartment or several compartments, in particular compartments next to and/or over one another, as a whole. During the determination of the storage location to be used for storage, the first, second, and third pieces of information are particularly considered. Thus, it might be possible that, depending on the storage position, spatial allocation, and load of storage locations occupied by any load carriers, a load carrier with a very high weight may also additionally be stored, without hereby exceeding the load limit according to the static design. As a whole, the method might enable an optimized or maximized capacity utilization of the rack.

According to one embodiment, the determination of the free storage location to be used for storing the load carrier only considers the load limit of those rack components of the compartment(s) in which the storage is to be carried out. This is subsequently designated as variant 1. Alternatively, the determination of the free storage location to be used for storing the load carrier only considers the load limit of those rack components of the field, in which the storage is to be carried out and/or only the load limit of those rack components of the compartment(s) which is/are adjacent to, in particularly laterally is/are adjacent to, the compartment(s) in which the storage is to be carried out. This is subsequently designated as variant 2. For example, variant 2 includes that either exclusively the load limit of those rack components of the compartment(s), which is/are adjacent to (in particular, laterally adjacent to) the compartment(s), in which the storage is to be carried out, is considered during the determination (variant 2 a), or that the load limit of those rack components of the field (in particular comprising several compartments), in which the storage is to be carried out, is considered (variant 2b), or that both the load limit of those rack components of the compartment(s), which is/are adjacent to (in particular, laterally adjacent to) the compartment(s), in which the storage is to be carried out, and also the load limit of those rack components of the field (in particular comprising several compartments, for example, below one another), in which the storage is to be carried out, are considered together (variant 2c). Because the field may have, for example, in particular several laterally adjacent compartments, variants 2a and 2b may also coincide.

If only the load limit of the rack components of the compartment(s), in which the storage is to be carried out, is considered (Variant 1), this might have the advantage of a very limited effort with respect to the resources (for example, memory, processing power) necessary for the determination of the storage location. Despite this, a statement may be reliably made with respect to the free storage location to be used for storing the load carrier. Any computing cost, which considers other rack components, not belonging to the compartment(s), is eliminated in this case.

In variant 2, in which the entire field and/or the neighboring compartments is/are considered, the determination of the free storage location to be used for storing the load carrier might be made at a high quality level. While in the first variant described above, preferably high safety margins may be provided with respect to the maximum load, in the variant considering the entire field and/or the neighboring fields, the possibility exists to minimize these safety margins with respect to individual compartments, thus to work locally under certain conditions with even higher loads.

In one practical example, the storage of a load carrier with a very high weight might not be possible in the first variant described, as in this case it is assumed, for example, that the remaining compartments of the associated field are all occupied at maximum fullness. The storage of the additional load carrier with a very high weight would thus overload [corrected from cede: überlassen] the field as a whole. In contrast, the second variant considers the current rack load with respect to far more components, which are actually relevant to the storage of the additional load carrier with a high weight. These include, in this example, not only the rack components of the compartment provided for storage, but also the rack components of the additional compartments of the field (this, in the definition of the field, comprises laterally neighboring fields or also, in the definition of the field, comprises compartments located above one another). If, in the extreme case, the remaining compartments of the field are unoccupied, a maximum permissible field load would not be exceeded, despite the storage of the additional load carrier, which ought to enable the storage of the additional load carrier (insofar as the compartment is not overloaded).

According to one embodiment, independent of the previously mentioned embodiments yet also implementable simultaneously with the same, the determination of the storage location is carried out such that the load limit is undershot as far as possible, or only just achieved as closely as possible. The first might have the advantages that the total load of the rack may be hereby minimized. This might increase the service life of the rack or, due to, e.g., the reduced potential deformations in the case of using guide means, to generally improve the operation of storage and retrieval devices (e.g., guide rails for shuttles in a channel storage warehouse). The improvement might enable, e.g., in the example of the storage and retrieval devices, faster speeds in the channel storage warehouse, for example. Another improvement might affect the direct storage and retrieval speeds, which is possible due to the storage and retrieval device.

The latter variant (to minimize the total load as much as possible), might have the advantage that the rack is populated with the maximum possible load.

According to one embodiment, the parts of the rack are limited to those rack components of the compartment(s) in which the storage is to be carried out. Alternatively, the parts of the rack comprise those rack components of the field, in which the storage is to be carried out, and/or the parts of the rack comprise those rack components of the compartments, which are adjacent to, in particularly are laterally adjacent to, the compartment(s), in which the storage is to be carried out.

Any advantages here apply analogously to that stated above for variant 1 and variant 2 with subvariants 2a, 2b, or 2c. It should be noted that, in particular in the case that storage and retrieval devices are used, which are guided by guide means arranged on the compartments, the consideration of rack components of the neighboring compartments might be of particular relevance. In the following, it is assumed without restricting the generality, that the storage and retrieval device is a shuttle and that the guide means are guide rails. Storage and retrieval device and "storage module" are to be herein understood as synonyms. The guide means might be fixed on parts of the rack, like load supports or specific rack crossbars, or might be part of the load supports or crossbars.

By considering the deformation of the neighboring compartments (in particular the deformation predicted for a potential implementation of the planned storage), a deformation of the guide rails for the shuttle might also be implicitly considered. This might in turn have the advantage that a maximum permissible deformation of parts of the compartments of the rack is considered as the functional limit, which, if exceeded, a guiding of the shuttle by the guide rails may no longer be guaranteed. Upon exceeding this, the shuttle might, for example, hang up or touch down on the guide rails, so that the functionality of the shuttle might no longer be guaranteed. Due to the stated consideration of the deformation of the neighboring compartments, it might be guaranteed in the case of storage and retrieval devices, which are (rail) guided through the rack, that their functionality is not impaired by the loading process. The deformation of the neighboring compartments may be considered, in particular, independently of variant 2; however, this is preferably carried out in an implementation of variant 2 in the potential subvariants 2a, 2b, or 2c.

According to one embodiment, the maximum permissible deformation specifies, particularly for this, one of the following: internal mechanical forces, system resilience, deformations, distortions. This might specifically comprise: shearing force at the support connection of the compartment, bending torque at the support connection of the compartment, deflection in the middle of the compartment or at the position of the load carrier to be stored, torsion angle at the support connection of the compartment, torsion angle in the middle of the compartment or at the position of the load carrier to be stored, deformation/deflection of rack components of compartments located above the compartment(s). It is possible that the listed variants of the deformation also affect rack components of one or more compartments, which are located above or below the compartment(s), for which the storage location determination is carried out.

According to one embodiment, the rack is a rack of an automated warehouse, e.g., a shuttle warehouse, wherein the compartments have load supports, e.g., cross members, horizontal supports, crossbars, arranged parallel to one another, wherein the load supports have optional guide means for a storage and retrieval device, e.g., a shuttle of the rack, wherein the maximum permissible deformation comprises a maximum permissible deformation of one of the load supports and in particular of the guide means.

According to one embodiment, the determination of the free storage location to be used further comprises the provision of an additional piece of information regarding the storage location to be used. This additional piece of information may comprise the mechanical parameters, e.g. deflection, general internal mechanical forces, etc., with respect to rack components of the compartment having the storage location, which are to be expected during storage in this storage location, optionally including the compartments adjacent to it. This might have the advantage that, e.g., based on this additional piece of information, the movement behavior, e.g., the travel speed of the above mentioned storage and retrieval device, may be controlled in a position-dependent way. Areas with a higher load and, e.g., more severe deformation would then, e.g., be passed through more slowly that areas, which are not loaded.

According to one embodiment, independent of the previously mentioned embodiments yet also implementable simultaneously with the same, the load limit comprises an overall maximum compartment load and/or field load for the rack, wherein the field load and the compartment load exclusively specify the weight with which the field or the compartment(s) may be maximally loaded as a whole. However, although the load limit specifies an overall maximum load for the rack, this load, in its overall form, is not used by itself when determining the storage location to be used. In addition, it is basically considered at which positions load carriers are stored in the compartment, and a determination of the storage location to be used for storage is carried out basically dependent on this.

According to one embodiment, the second piece of information specifies a load equal to zero as an indication that a storage location is free, with respect to this free storage location. In this respect, there might be flexibility in how the second piece of information specifies that a storage location is "free". Instead of a marking with the explicit indication "free", a load indication "ZERO" might also be sufficient.

According to one embodiment, the load of the storage locations occupied by any load carriers and the weight of the load carrier to be stored are respectively assigned to a weight category from a set of weight categories, wherein the first and third pieces of information specify the weight category and the determination of the storage location is carried out based on the weight categories. In particular this may be a manageable number of weight categories, for example, a number from the interval of 2 to 15, preferably from 2 to 10, more preferably from 2 to 8, particularly preferably either 2, 3, 4, 5, or 6 weight categories.

This might have the advantage that the resource expenditure for determining the storage location to be used is minimized. In one example, a limitation to merely two weight categories might be sufficient, for example, load carrier type A with a weight less than or equal to maximum weight 1, and load carrier type B heavier than maximum weight 1 and lighter than maximum weight 2. Subsequently, it might be defined for different storage positions per compartment, in particular with very limited expenditure, which load carriers from which combinations of weight categories are permitted to be stored there. This variant might be suitable, in particular for one embodiment subsequently described farther below, in which the determination of the storage location is carried out using a predetermined chart or a predetermined table. By using the weight categories, the scope of the charts or the tables might be thus reduced.

According to one embodiment, in the case that any type of storage of the load carrier would result in exceeding the load limit for the compartment(s) in the case of that free storage location, the determination of the free storage location to be used for storing the load carrier indicates that no storage location is to be used for storage. This might have the advantage that a situation is prevented which would have led to overloading the rack.

In the case that the determination of the free storage location to be used for storing the load carrier specifies, with regard to the compartment(s), that no storage location is to be used for storage, the method may further comprise a selection of another of the compartment(s) or another field of the rack, wherein the storage location determination is then correspondingly carried out for the other compartment(s) or the other field and the compartments and storage locations there.

This might thereby help to maximize the utilization of the rack in a flexible way. The method might search for a suitable storage location until this is found. Starting from a single compartment, the search might thus be extended to the entire rack or to a predefined, limited area, for example, a maximum N compartments or fields away from the original compartment.

According to one embodiment, independent of the previously mentioned embodiments yet also implementable simultaneously with the same, the determination of the storage location is carried out by a control unit, wherein the control unit is equipped with a plurality of assignments for the compartment(s), wherein each assignment specifies which free storage location of the compartment is usable for storing load carriers, depending on a combination of pieces of information, wherein each combination of pieces of information comprises an individual combination variant of spatial allocations and loads of storage locations occupied by load carriers, the spatial location of one or more free storage locations of the field, and weights (if necessary from weight categories in the number mentioned above) of load carriers to be stored, wherein the first, second, and third pieces of information are transmitted as a current combination of pieces of information to the control unit for the determination of the storage location, and wherein, as a response to the transmission and on the basis of the assignments, the free storage location assigned to this current combination of pieces of information and to be used for storage is determined by the control unit.

For example, the plurality of assignments is mapped by a chart of a table.

This might have the advantage that, in some circumstances, a complex analytical calculation regarding the storage location to be used, is omitted. For example, the plurality of assignments might be calculated previously on a powerful computer, and provided to the control unit as a prepared set of assignments. A high computational capacity is no longer necessary with respect to the control unit. A simple "lookup" in the set of assignments is sufficient to determine which of the assignments is relevant for the combination of pieces of information of the currently available first, second, and third pieces of information. This applies in particular for manageable numbers of weight categories, as mentioned above.

In one variant, the determination of the storage location is carried out by a control unit, wherein the control unit calculates the load of the rack for the case of storing the load carrier in one or more of the free storage locations on the basis of the first, second, and third pieces of information, then compares the respectively calculated load with the load limit, and subsequently determines the free storage location to be used for storage based on the comparison. This might have the advantage that a higher flexibility with respect to the storage, and thus also a higher utilization of the rack, is possible due to the calculation.

For example, the control unit carries out the calculation by means of a set of equations, wherein the set of equations maps the mechanical structure of the compartment and optionally the rack supports of the field as flexible supports, wherein the first, second, and third pieces of information are entered into the set of equations for the calculation. For example, the load limit may be specified by at least one of the following: a maximum bending torque M, a maximum lateral force Q, a maximum deflection w, a maximum torsion.

The use of a set of equations which map the rack components as flexible supports, might have the advantage that, despite the accompanying quite exact description of the deformation process of rack components, a computationally operable implementation of the calculation is possible with a manageable expenditure of resources. The calculation may thus be carried out, for example, practically in real-time, without requiring an extreme computational expense, as this exists, for example, for a numerical calculation (e.g., finite element method). The use of the set of equations may form a good compromise between the goal of the most precise mapping of the rack system on the one hand, and the demand for the least possible calculable complexity on the other.

In another aspect, the invention relates to a computer program product with instructions executable on a processor for carrying out the method described above.

In another aspect, the invention relates to a rack system with a rack for storing load carriers in the rack, wherein a load limit according to a static design is assigned to the rack with respect to the load with load carriers, wherein the rack has fields, each with multiple compartments, and the compartments each have one or more storage locations for load carriers, wherein the rack system has a control unit, wherein the control unit is designed to carry out a storage location determination, wherein the storage location determination comprises: receiving a first piece of information regarding the spatial allocation and respective load of storage locations of one or more compartments occupied by any load carriers; receiving a second piece of information regarding the spatial location of one or more free storage locations of the compartment(s); receiving a third piece of information regarding the weight of the load carrier to be stored; determination of the free storage location of the compartment to be used for storing the load carrier on the basis of the first, second, and third pieces of information and the load limit, wherein the determination is carried out such that the load limit is not exceeded by the storage of the load carrier.

It is to be noted that the embodiments and examples described above may be combined or modified in any way as long as these combinations are not mutually exclusive.

Figure 2:
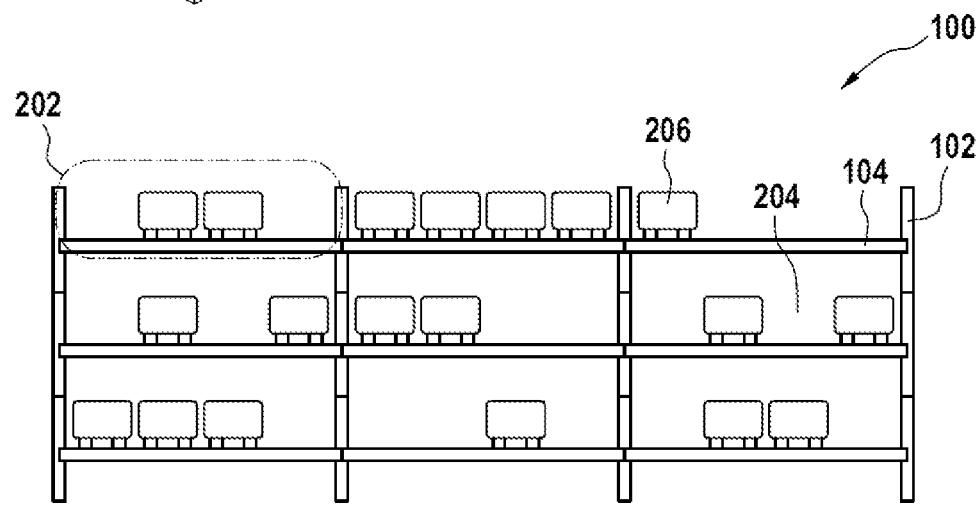
Figure 5:
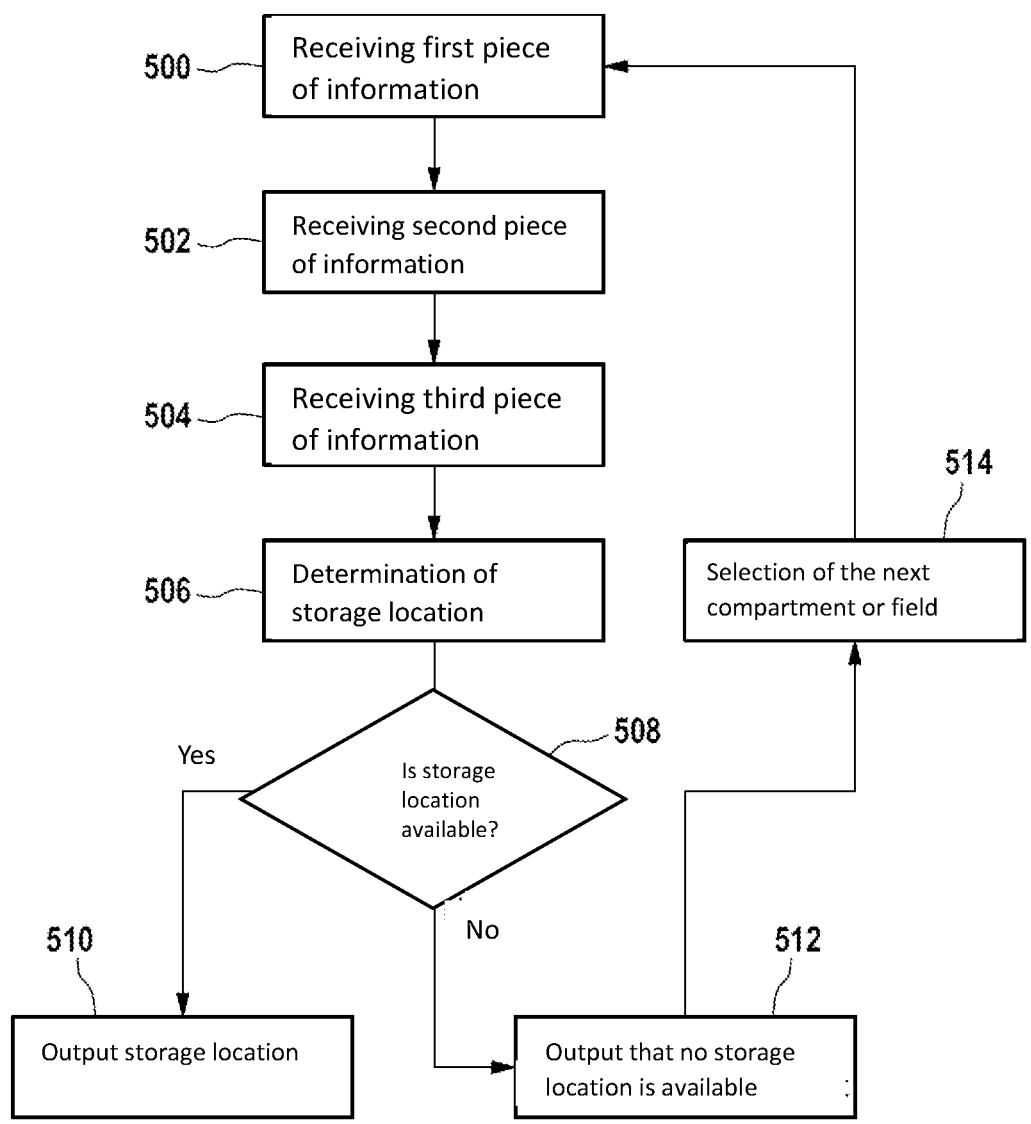
Figure 6:
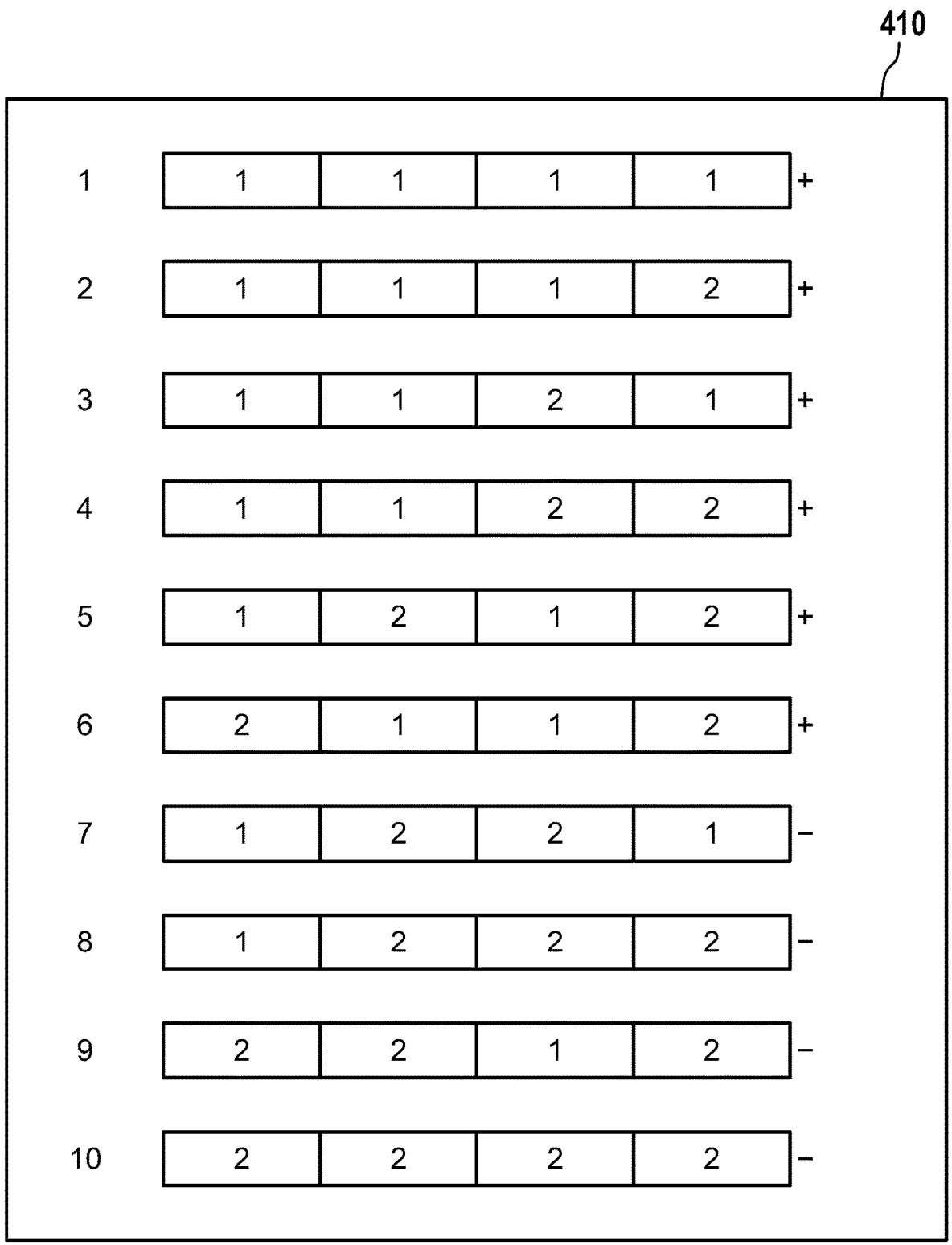

In the following, preferred embodiments of the invention are explained in detail with reference to the drawings. As shown in:

FIG. 1 a rack,
FIG. 2 a cross section of a rack,
FIG. 3 a comparison of two racks with different permissible loads,
FIG. 4 a rack with a control unit as a rack system,
FIG. 5 a flow chart of a method for storing load carriers in a rack,
FIG. 6 a table with combinations of information.

In the following, similar elements are designated with identical reference numerals.

FIG. 1 shows a rack 100 with load supports, e.g. cross members, horizontal supports, or crossbars 104, running in the rack longitudinal direction. In the following, "crossbars" 104 will be discussed for the sake of simplicity and without limiting the generality. The crossbars are fixed to corresponding struts 102 of rack 100 using known fastening means or fastening types.

Crossbars 104 are optionally connected to one another via rack panels 106. Crossbars 104 lying respectively opposite one another are respectively connected, e.g., by multiple rack panels 106 arranged perpendicular thereto. The upper side of the crossbars and/or of rack panels 106 forms a storage plane for storing load carriers, thus storage locations.

FIG. 2 shows a cross section of a rack 100. The rack has multiple planes located above one another. Various stored load carriers 206 are located in the planes. In addition, there are multiple free storage locations 204 with respect to rack 100. The area 202 between 2 rack struts is designated as compartment 202 with respect to one plane. Multiple compartments 202, arranged over one another, form a so-called field 200.

FIG. 3 illustrations a comparison of two racks with different permissible loads. In FIG. 3a, the rack is designed such that it is assumed that a load carrier with a load m_max is respectively located at each storage location in all compartments of field 200. In this respect, a design of the rack results with respect to the loading with load carriers 206 with a load limit according to a static design which, together with m_max per storage location, defines a maximum compartment load (e.g., 3×m_max) and a maximum field load (e.g. 4× maximum compartment load). The specifications of the load limits according to FIG. 3a would not permit, for example, storing a single load carrier in the lowest empty compartment 202, whose load lies slightly above the maximum permissible load m_max but far below the maximum compartment load.

In contrast, an overall assessment is carried out in FIG. 3b, either per compartment or even with respect to entire field 200. In this overall assessment, the actual spatial distribution and the respective load of the storage locations occupied by load carriers 206, the spatial location of the free storage location (204) and the weight of the load carrier 400 to be stored are considered.

A practical example of such a method for storing load carriers in a rack analogous to FIG. 3b is subsequently illustrated with respect to FIG. 4 in connection with the flowchart of FIG. 5. FIG. 4 shows a rack 100 with multiple fields 200 arranged next to one another, which respectively have different compartments 202 for storing load carriers. A control unit 406 is assigned to the rack. The control unit may be part of the rack, so that rack 100 and control unit 406 form a rack system. Or the control unit may be, e.g., a cloud component.

The control unit is equipped with, e.g., a memory 408 with a table or a chart 410 and instructions 412. The instructions may be executed by processor 414 of the control unit. The execution of instructions 412 by processor 414 prompts control unit 406 to transmit, e.g., control commands to storage and retrieval device 404. Likewise, information regarding the spatial allocation and respective load of storage locations of rack 100 occupied by any load carriers 206 may be received via interface 416 of control unit 406. The same applies with respect to receiving a piece of information regarding the spatial location of one or more free storage locations 204 (or free storage locations 204a-204d in FIG. 4). The control unit may receive a piece of information regarding the weight of load carrier 400 to be stored via interface 416. Instructions 412 may be used for the storage location determination for load carriers 400 to be stored.

The control unit may receive spatial allocation and load of storage locations occupied by any load carriers, for example, by means of sensors integrated into rack 100 or generally from an external entity via interface 416. The same applies regarding the information regarding the spatial location of the free storage locations. Storage and retrieval device 404 may likewise be equipped with a sensor, via which the weight of load carrier 400 to be stored may be determined.

Another possibility, to obtain the information regarding the spatial allocation and load of storage locations occupied by any load carriers and the free storage locations, lies preferably in that control unit 406 is equipped with information about all previously carried out storage and removal processes. In this respect, memory 408 might also function such that the control unit "takes note of" which weight or which weight category is stored at which position. Thus, control unit 406 is equipped with a complete picture regarding the occupation of rack 100 with load carriers, including the information regarding the respective load of storage positions by stored load carriers.

The determination of the storage location in rack 100 to be used for storing load carrier 400 is carried out (here, in particular by control unit 406) either on the basis of table 410 (which applies analogously for using a chart 410) or based on a calculation program. The latter may be contained in instructions 412. One example of a table is shown in FIG. 6.

For simplicity's sake, table 412 only considers load carriers in a single compartment, without considering any other compartments located next to this compartment and other compartments of the field of this compartment. In addition, it would be possible that, e.g. the storage possibilities are determined only for a single compartment there; however, the influence on the load of the rack or the compartment by neighboring compartments (left, right, behind, in front, above, and/or below) is additionally considered. Alternatively or additionally, it would be possible that multiple compartments are simultaneously considered in "parallel", and the storage location determination is carried out for multiple compartments—the result would be a storage location from one or more compartments, e.g., the storage location which causes, e.g., the lowest rack load or compartment load with respect to the compartments under consideration.

By way of example, it is assumed in FIG. 6 that load carriers are divided into weight categories, namely into category 1 and category 2. Category 1 would correspond to, for example, a weight less than or equal to 35 kg and category 2 would correspond to a weight greater than 35 kg up to a maximum 50 kg. In addition, whether this combination of weight categories is permissible or not is indicated in the table, for each of the combinations of weight categories of the load carriers shown, at the end of the respective table line in the form of a plus (+) or a minus (−).

In FIG. 4, load carriers with a weight of category 1 are indicated without shading and load carriers with a weight of category 2 are indicated with shading. If, for example, load carrier 400 of category 2 is to be stored by storage and retrieval device 404 in right field 200, lower compartment 202, position 204d results here as the storage position.

In step 500, the control unit receives a first piece of information regarding the spatial allocation and respective load of storage locations occupied by load carriers 206, for example, in upper compartment 202 of left field 200. The first piece of information states, for example, that the left two of the already stored load carriers correspond to weight category 2 and the load carrier located next to them corresponds to weight category 1. In addition, control unit 406 receives in step 502 a second piece of information that the right storage location 204a is unoccupied. Control unit 406 receives, as the third piece of information in step 504, the piece of information that load carrier 400 to be stored belongs to category 2. As previously mentioned, the reception may be carried out from sensors of rack 100 via interface 416, or the reception may be carried out from memory 408, in which this information is stored from earlier storage processes.

Subsequently, the determination of the free storage location of the compartment to be used for storing load carrier 400 is carried out in step 506 on the basis of the obtained information and also on a load limit, which is assigned to the rack according to a static design. This load limit indicates how heavily the rack, or, in the present case, how heavily compartment 202 may be loaded. The determination 506 of the storage location to be used considers this load limit, thus ensures that this will not be exceeded. Table 410 of the figure was calculated and generated previously and precisely considers this criterion that the load limit is not exceeded.

In the example of use from table 410, control unit 406 may check whether, for example, a combination of load carriers with weight categories in the sequence 2,2,1,2, is permissible. As demonstrated in line 9 of the table from FIG. 6, such a combination, "combination of pieces of information" of load carriers is not permissible in the compartment, and would lead to overloading and thus to non-compliance with the load limit of the compartment. As a result, the check in step 508 yields that no storage location is available. An optional corresponding output follows this in step 512, that no storage location is available. The latter would be helpful, e.g., if storage and retrieval device 404 is a manual device operated by a person, like a forklift. The "forklift driver" is now informed about the fact that load carrier 400 may not be stored at position 204a.

The method subsequently continues in step 514, for example, in particular in the case of a fully automated rack system (rack 100 and automated storage and retrieval device 404), with the selection of the next compartment or field. For example, if in left field 200, each compartment is checked regarding the storage location determination, step by step and from top to bottom, then the respective second piece of information will indicate that no storage location is available. In this variant, the search for the available compartment would concentrate on the middle field 200. Likewise, moving stepwise from top to bottom would indicate, with respect to the middle compartment of the middle field, that storage is not permissible according to table 410, line 7 and line 9 (combination 2,2,1,2 or 2,2,2,1).

It should be noted at this point that unoccupied compartments are also assigned to weight category 1 in the example of the table from FIG. 6. Naturally, another weight category 0 may be added here for unoccupied compartments, which would further increase the granularity of the determination of the free storage location to be used. The table from FIG. 6 would be correspondingly expanded. It is likewise conceivable to add further criteria to the table from FIG. 6. For example, it is conceivable that it is additionally considered whether an overall weight of the load carriers actually stored in the compartment, optionally including the load carrier to be stored, exceed a certain maximum value or not. In this variant, it might even be checked whether a load carrier, which is heavier than the mentioned 50 kg (neither category 0 nor 1 nor 2) might be stored, if the stated maximum value is not exceeded.

Returning to rack 100 from FIG. 4, the result, with respect to middle field 200, is that storage there is not possible. The same arises with respect to storage locations 200b[sic] and 204c of the right field (upper compartment). The combinations 2,1,2,2 and 2,2,1,2 are not permissible according to line 9. In this system, it is assumed that the lines must each be observed symmetrically. Line 2 would thus correspond to both a combination 1,1,1,2 and also 2,1,1,1.

With respect to free storage location 204e, there is also no other result. With respect to storage location 204d, the determination in step 506 results in that a combination 2,1,1,2 is permissible according to line 6 of table 410. Therefore, step 508 results that a storage location is available, and this storage location is output to storage and retrieval device 404. Storage and retrieval device 404 subsequently stores load carrier 400 in the compartment at storage location 204d.

In addition to storage and retrieval device 404, FIG. 4 also shows guide means, e.g., a guide rail 402, along which storage and retrieval device 404 may be guided and moved. If, in a more complex variant, the determination of the storage location in step 506 considers not only the respective current compartment, but also any other compartments and their loads, located next to this compartment, this might have the advantage that a deformation of the rack or of the guide rail mounted on the rack is considered during the determination of the storage location to be used. For example, it is possible that the guide rail is fixed on crossbars 104 of rack 100 (see FIG. 1), so that a deformation of crossbars 104 caused by weight might also lead to a corresponding deformation of guide rail 402. This might negatively impact the guide function of the storage and retrieval device.

Instead of using a table, as already mentioned, a calculation may take place, regarding which storage location is to be used for storing load carrier 400. The determination is carried out, e.g., in that (for each storage process) the actual load of the compartment or rack is known (analogous to using the table, see above), and it is checked with regards to a permissible load, whether the load carrier weight to be stored may still be stored at the respective position. The permissible load is defined, e.g., for a uniformly distributed load and using a "fictitious" max_fictiv or "average" load carrier load. For this design, different relevant mechanical parameters of the compartment may be determined and are documented as "limit values" and load limit. E.g., shearing force, bending torque at the support connection, max. deflection in the middle of the compartment, torsion angle at the support connection and in the middle of the compartment.

The "rack structure" is mapped, e.g., using a set of equations as flexible supports with corresponding mechanical properties. If load carrier 400 is to be stored, then an algorithm containing instructions 412 is used in step 506 for each compartment: the load carrier loads located in this compartment are supplemented by the load carrier to be stored and the resulting mechanical parameters are verified against the "limit values". If the resulting mechanical parameters are less than the respective limit values, the load carrier may be stored.

The person skilled in the art will understand that aspects of the present invention may be implemented as a device, method, or computer program or computer program product.

Correspondingly, aspects of the present invention may assume the form of a pure hardware embodiment, a pure software embodiment (including firmware, software located in the memory, micro code, etc.), or an aspect combining software and hardware aspects, which may be generally designated here as a "circuit", "module", or "system". Furthermore, aspects of the present invention may assume the form of a computer program product, which is supported by a computer-readable medium or by multiple computer-readable media in the form of computer-executable code. A computer program likewise comprises the computer-executable code. "Computer-executable code" may also be designated as "computer program instructions".

Any combination of one computer-readable medium or multiple computer-readable media may be used. The computer-readable medium may be a computer-readable signal medium or a computer-readable memory medium. A "computer-readable memory medium", as used herein, comprises a material memory medium, which may store instructions which are executable by a processor of a computer device. The computer-readable memory medium may be designated as a computer-readable non-volatile memory medium. The computer-readable memory medium may be designated as a tangible computer-readable memory medium. In some embodiments, a computer-readable memory medium may also be able to store its data, which enables it to access it using the processor of the computer device. Examples of computer-readable storage media comprise, but are not limited to: a diskette, a magnetic hard drive, a solid state hard drive, flash memory, a USB stick, random access memory (RAM), read-only memory (ROM), an optical disk, a magneto-optical disk, and the register file of the processor. Examples of optical disks comprise compact disks (CD), and digital versatile disks (DVD), for example, CD-ROM, CD-RW, CD-R, DVD-ROM, DVD-RW, or DVD-R disks. The expression computer-readable memory medium relates to different types of recording media, which are suitable to be called up by the computer device via a network or a communication connection. For example, data may be called up via a modem, via the internet, or via a local network. Computer-executable code, which is executed on a computer-readable medium, may be transmitted via any suitable medium, including but not limited to: wireless, hardwired, optical fiber, RF, etc., or any suitable combination of existing media.

A computer-readable signal medium may contain a propagated data signal, which contains the computer-readable program code, for example, in a base signal (baseband) or as part of a carrier signal (carrier wave). This type of propagation signal may take any form, including but not limited to: an electromagnetic form, an optical form, or any suitable combination thereof. A computer-readable signal medium may be any computer-readable medium, which is not a computer-readable memory medium, and which may transmit, propagate, or transport a program for use by or in connection with a system, device, or equipment for executing instructions.

"Computer memory" or "memory" is an example of a computer-readable memory medium. A computer memory is any memory which is directly accessible by a processor.

"Computer data memory" or "data memory" is another example of a computer-readable memory medium. Computer data memory is any non-volatile computer-readable memory medium. In some embodiments, a computer memory may also be a computer data memory or vice versa.

A "processor" as used here comprises an electronic component which is able to execute a program-executable or machine-executable instruction or computer-executable code. A reference to a computer device, which comprises a "processor", is to be interpreted such that it potentially comprises more than one processor or processing core. The processor may be, for example, a multi-core processor. A processor may relate to a collection of processors within a single computer system or distributed across multiple computer systems. The expression "computer device" or computer is also to be interpreted so as to potentially refer to a collection or a network of computer devices or computers, which each comprise a processor or processors. The computer-executable code may be executed by multiple processors, which may be distributed within the same computer device or even across multiple computers.

Computer-executable code may comprise machine-executable instructions or a program, which allows a processor to execute an aspect of the present invention. Computer-executable code for executing operations for aspects of the present invention may be written in any combination of one or more programming languages, including an object oriented programming language like Java, Smalltalk, C++ or the like, and conventional method oriented programming languages like the "C" programming language or similar programming languages, and translated into machine-executable instructions. In some cases, the computer-executable code may be present in the form of a higher level programming language or in a pre-translated form, and is used in connection with an interpreter which generates the machine-executable instructions.

The computer-executable code may be executed completely on the computer of a user, partially on the computer of a user, as an independent software package, partially on the computer of a user and partially on a remote computer or completely on a remote computer or sensor. In the latter case, the remote computer may be connected to the computer of the user by any type of network, including a local network (LAN) or a wide area network (WAN), or the connection may be established using an external computer (for example, via the internet using an internet service provider).

The computer program instructions may be executed on one processor or on multiple processors. In the case of multiple processors, these may be distributed across multiple different entities (e.g., clients, servers). Each processor may execute a part of the instructions provided for the respective entity. When a system or method that comprises multiple entities is discussed, then the computer program instructions are understood to be adapted to the same in order to be executed by a processor belonging to or assigned to the respective entity.

Aspects of the present invention are described with reference to flowchart depictions and/or block diagrams of methods, devices (systems), and computer program products according to embodiments of the invention. Reference is made to the fact that each block or parts of the blocks of the flow charts, depictions and/or the block diagrams may be executed by computer program instructions, if necessary in the form of a computer-executable code. Reference is further made to the fact that combinations of blocks in different flow charts, depictions and/or block diagrams may be combined, if they are not mutually exclusive. These computer program instructions may be provided to a processor of a general-purpose computer, special-purpose computer, or another programmable data processing device in order to create a device so that the instructions, executed via the process of the computer or of the other programmable data processing device, generate means for executing the functions/steps determined in the block(s) of the flowchart and/or the block diagrams.

These computer program instructions may also be stored on a computer-readable medium, they may control a computer or other programmable data processing devices or other devices, that they function in a certain way, so that the instructions stored on the computer-readable medium produce a manufactured product, including instructions, which implement the function/step determined in the block(s) of the flow chart and/or of the block diagrams.

These computer program instructions may also be stored on a computer, other programmable data processing devices, or other devices, in order to effect the execution of a sequence of process steps on the computer, other programmable data processing devices, or other devices, in order to create a process executed on a computer, so that the instructions executed on the computer or the other programmable devices generates a methods for implementing the functions/steps determined in the block(s) of the flowchart and/or the block diagrams.

LIST OF REFERENCE NUMERALS

100 Rack
102 Rack struts
104 Crossbars
106 Rack panels
200 Field
202 Compartment
204 Storage location
206 Stored load carrier
400 Load carrier to be stored
402 Guide rail
404 Storage and retrieval device
406 Control unit
408 Memory
410 Table, chart
412 Instructions
414 Processor
416 Interface

The invention claimed is:

1. A method for storing load carriers in a rack, wherein a load limit according to a static design is assigned to the rack with respect to the load with load carriers, wherein the rack has fields each with multiple compartments, and the compartments each have one or more storage locations for load carriers, wherein the method comprises a storage location determination, which comprises:
  receiving a first piece of information regarding the spatial allocation and respective load of storage locations of one or more of the compartments occupied by any load carriers,
  receiving a second piece of information regarding the spatial location of one or more free storage locations of the compartment(s),
  receiving a third piece of information regarding the weight of the load carrier to be stored,
  determination of the free storage location of the compartment(s) to be used for storing the load carrier on the basis of the first, second, and third pieces of information and the load limit, wherein the determination is carried out such that the load limit is not exceeded by the storage of the load carrier, wherein the load limit specifies either a maximum permissible deformation of rack components or a load threshold above which structural failure of the rack threatens to occur.

2. The method according to claim 1, wherein the determination of the storage location is carried out such that the load limit is undershot as far as possible, or only just achieved as closely as possible.

3. The method according to claim 1, wherein the determination of the free storage location to be used for storing the load carrier
only considers the load limit of those rack components of the compartment(s) in which the storage is to be carried out, or
only considers the load limit of those rack components of the field in which the storage is to be carried out and/or only considers the load limit of those rack components of the compartments which are adjacent to the compartment(s) in which the storage is to be carried out.

4. The method according to claim 1, wherein the determination of the storage location considers any deformation of parts of the rack occurring during the storage of load carrier, wherein the determination is carried out such that the maximum permissible deformation of the parts is not exceeded.

5. The method according to claim 4, wherein
the parts of the rack are limited to those rack components of the compartment(s) in which the storage is to be carried out, or
the parts of the rack comprise those rack components of the field, in which the storage is to be carried out, and/or the parts of the rack comprises those rack components of the compartment(s), which is/are adjacent to the compartment(s), in which the storage is to be carried out.

6. The method according to claim 4, wherein the rack is a rack of an automated warehouse, wherein the compartments have load supports arranged parallel to one another, wherein the maximum permissible deformation comprises a maximum permissible deformation of one of the load supports.

7. The method according to claim 6, wherein the determination of the free storage location to be used further comprises the provision of an additional piece of information regarding the load of the storage location to be used, wherein the movement behavior of the storage and retrieval device is controlled in a position-dependent way on the basis of this additional piece of information.

8. The method according to claim 1, wherein the load of the storage locations occupied by any load carriers and the weight of the load carrier to be stored are respectively assigned to a weight category of a set of weight categories, wherein the first and third pieces of information specify the weight category and the determination of the storage location is carried out based on the weight categories.

9. The method according to claim 1, wherein, in the case that any storage of the load carrier would result in exceeding the load limit for the compartment(s) for that free storage location, the determination of the free storage location to be used for storing the load carrier indicates that no storage location is to be used for storage.

10. The method according to claim 9, wherein, in the case that the determination of the free storage location to be used for storing the load carrier indicates for the compartment(s) that no storage location is to be used for storage, the method may further comprise a selection of one or more other compartment(s) or another field of the rack, wherein the storage location determination is subsequently correspondingly carried out for the other compartment(s) or the other field and the storage locations there.

11. The method according to claim 1, wherein the determination of the storage location is carried out by a control unit, wherein the control unit is equipped with a plurality of assignments for the compartment, wherein each assignment specifies which free storage location of the compartment(s) is usable for storing load carriers, depending on a combination of pieces of information, wherein each combination of pieces of information comprises an individual combination variant of spatial allocations and loads of storage locations occupied by load carriers, the spatial location of one or more free storage locations of the field, and weights of load carriers to be stored, wherein the first, second, and third pieces of information are transmitted as a current combination of pieces of information to the control unit for the determination of the storage location, and wherein, as a response to the transmission and on the basis of the assignments, the free storage location to be assigned by this current combination of pieces of information and to be used for storage is determined by the control unit.

12. The method according to claim 1, wherein the determination of the storage location is carried out by a control unit, wherein the control unit
calculates the load of the rack for the case of storing the load carrier in one or more of the free storage locations on the basis of the first, second, and third pieces of information,
compares the respectively calculated load with the load limit, and
determines the free storage location to be used for storage on the basis of the comparison.

13. The method according to claim 12, wherein the control unit carries out the calculation by means of a set of equations, wherein the set of equations maps the mechanical structure of the compartment(s), wherein the first, second, and third pieces of information are entered into the set of equations for the calculation.

14. A computer program product with processor-executable instructions for carrying out the method according to claim 1.

15. A rack system with a rack for storing load carriers in the rack, wherein a load limit according to a static design is assigned to the rack with respect to the loading with load carriers, wherein the rack has fields each with multiple compartments, and the compartments each have one or more storage locations for load carriers, wherein the rack system has a control unit, wherein the control unit is designed for carrying out a storage location determination, wherein the storage location determination comprises:
receiving a first piece of information regarding the spatial allocation and respective load of storage locations of one or more of the compartments occupied by any load carriers,
receiving a second piece of information regarding the spatial location of one or more free storage locations of the compartment(s),
receiving a third piece of information regarding the weight of the load carrier to be stored,
determination of the free storage location of the compartment(s) to be used for storing the load carrier on the basis of the first, second, and third pieces of information and the load limit, wherein the determination is carried out such that the load limit is not exceeded by the storage of the load carrier, wherein the load limit specifies either a maximum permissible deformation of rack components or a load threshold above which structural failure of the rack system threatens to occur.

16. The method according to claim 5, wherein the rack is a rack of an automated warehouse, wherein the compartments have load supports arranged parallel to one another, wherein the maximum permissible deformation comprises a maximum permissible deformation of one of the load supports.

\* \* \* \* \*